United States Patent
Perez

(10) Patent No.: US 6,932,371 B2
(45) Date of Patent: Aug. 23, 2005

(54) BICYCLE FRAME WITH REAR PASSIVE SUSPENSION

(76) Inventor: Ricardo Perez, 5635 Woodland Creek Dr., Kingwood, TX (US) 77345

( * ) Notice: Subject to any disclaimer, the term of this patent is extended or adjusted under 35 U.S.C. 154(b) by 0 days.

(21) Appl. No.: 10/677,702

(22) Filed: Oct. 2, 2003

(65) Prior Publication Data

US 2004/0160036 A1 Aug. 19, 2004

Related U.S. Application Data

(60) Provisional application No. 60/447,439, filed on Feb. 14, 2003.

(51) Int. Cl.$^7$ .............................................. B62K 19/04
(52) U.S. Cl. ........................ 280/283; 280/275; 280/284
(58) Field of Search ................................. 280/275, 283, 280/284, 288, 295

(56) References Cited

U.S. PATENT DOCUMENTS

| | | | |
|---|---|---|---|
| 616,383 A | 12/1898 | Willatt | |
| 3,030,124 A | 4/1962 | Holloway | |
| 3,917,313 A | * 11/1975 | Smith et al. | ................ 280/284 |
| 3,966,230 A | 6/1976 | Nicol | |
| 4,437,679 A | 3/1984 | Campagnolo | |
| 4,621,827 A | 11/1986 | Klein | |
| 4,838,569 A | 6/1989 | Ford | |
| 5,240,269 A | 8/1993 | Kerr | |
| 5,544,907 A | * 8/1996 | Lin et al. | ..................... 280/283 |
| 5,586,780 A | 12/1996 | Klein et al. | |
| 5,593,168 A | 1/1997 | Chou | |
| 5,803,477 A | * 9/1998 | Reisinger | ..................... 280/275 |
| 5,971,416 A | * 10/1999 | Hsiung | ........................ 280/283 |
| 6,109,637 A | 8/2000 | Kirk | |
| 6,267,399 B1 | * 7/2001 | Buckmiller et al. | ........ 280/274 |
| 6,318,744 B1 | * 11/2001 | Lester | ..................... 280/281.1 |
| 6,497,427 B1 | * 12/2002 | D'Alusio et al. | ........... 280/288 |
| 6,659,487 B1 | * 12/2003 | Raco | .......................... 280/275 |
| 2001/0028158 A1 | * 10/2001 | Devitt et al. | ................ 280/283 |
| 2002/0130485 A1 | * 9/2002 | Schonfeld | ................... 280/283 |

* cited by examiner

Primary Examiner—Matthew Luby
(74) Attorney, Agent, or Firm—Kenneth A. Roddy

(57) ABSTRACT

A bicycle frame (10) having a rear passive suspension system configured to elastically deflect predominantly in a vertical direction under normal cycling loads so as to better isolate the rider from road-surface irregularities and roughness, while simultaneously maintaining or improving rigidity in other directions so as to preserve or improve handling. The frame (10) has a pair of upper chain stays (18) that control the rear wheel motion rigidly in five of the six degrees of freedom with stiffness comparable to existing road, cyclocross, hybrid, city, or hardtail mountain bicycle designs, while simultaneously allowing deflection of the tubular members and a significant amount of vertical movement of the rear wheel for ride compliance in order to improve comfort, handling, and safety.

19 Claims, 8 Drawing Sheets

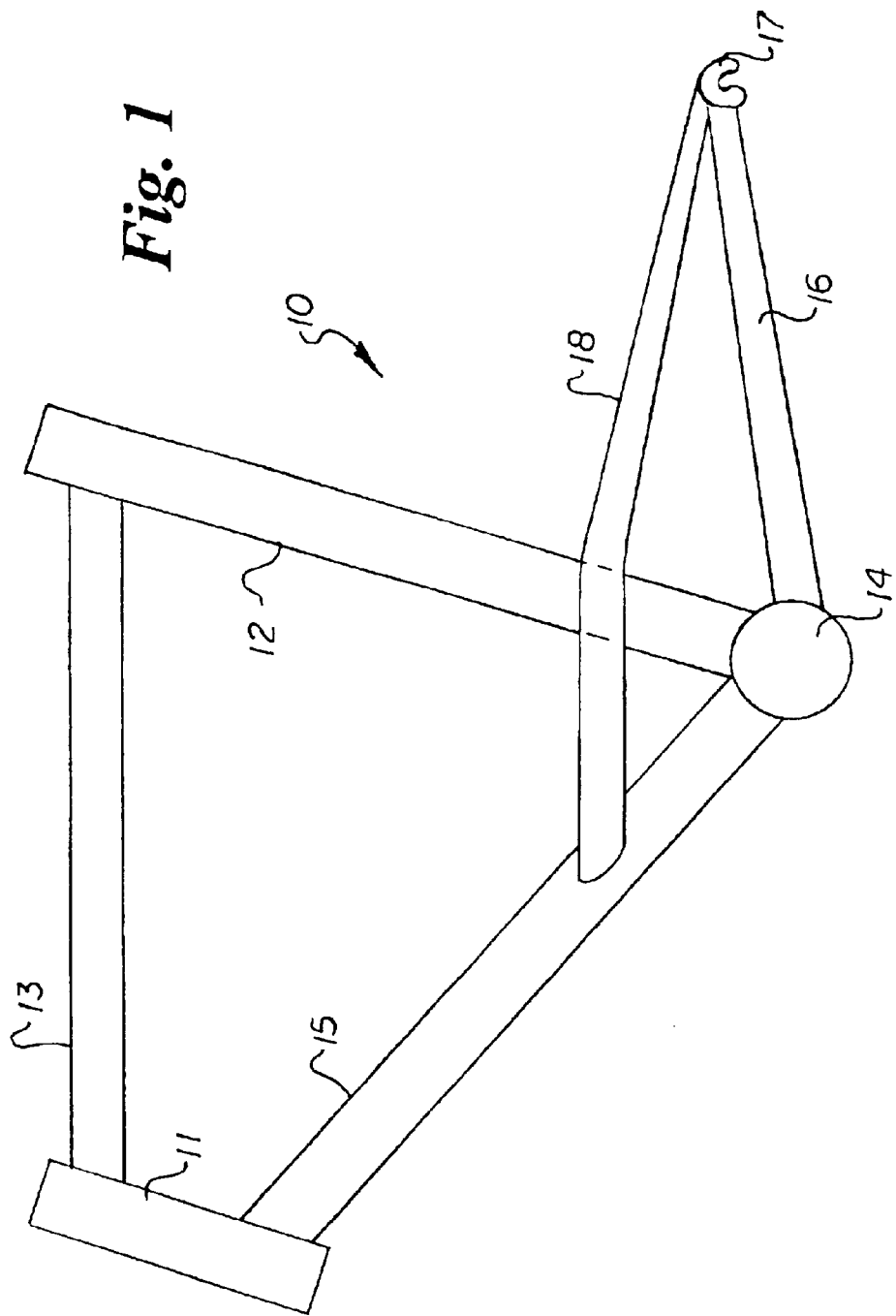

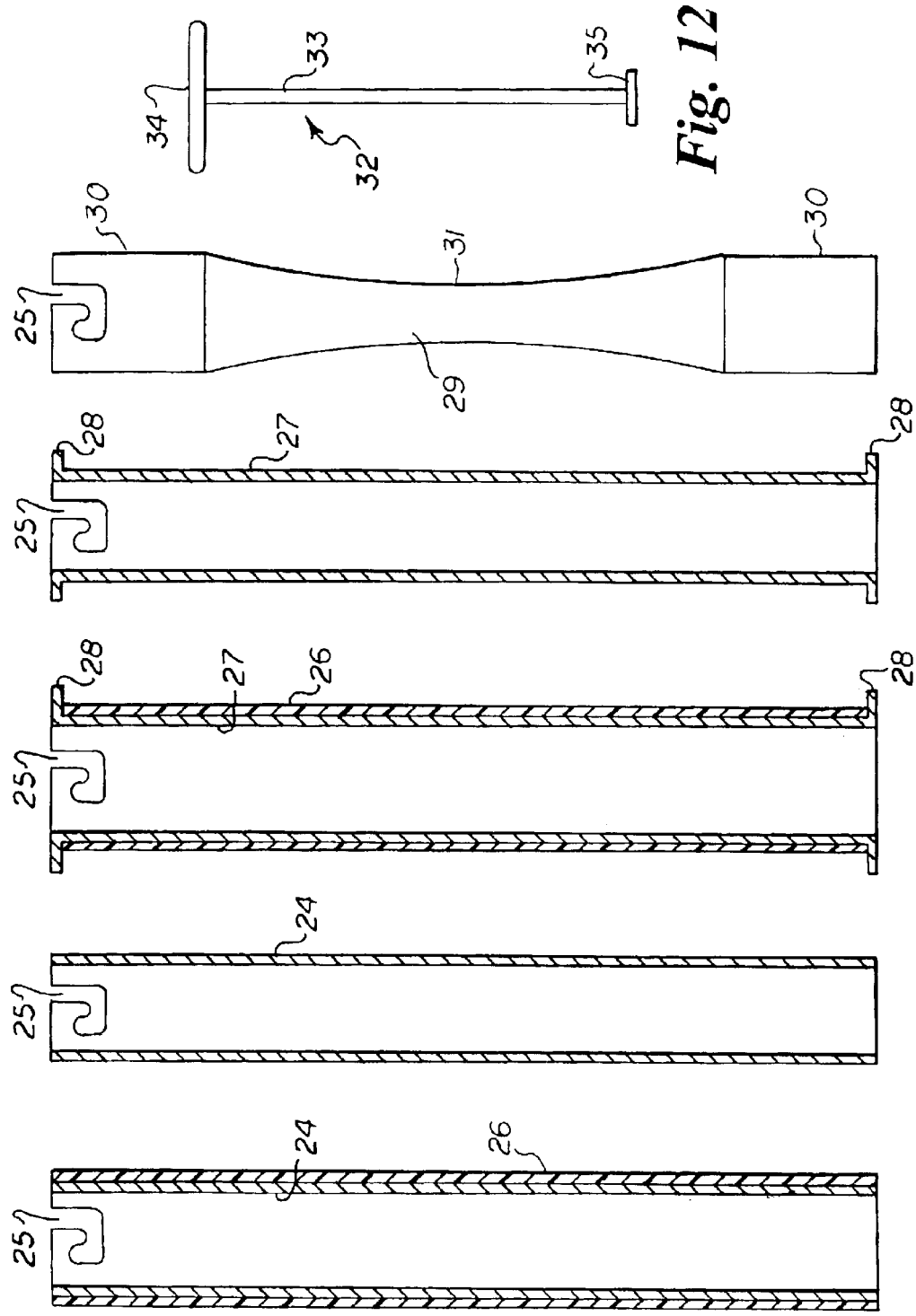

BICYCLE FRAME WITH REAR PASSIVE SUSPENSION

CROSS REFERENCE TO RELATED APPLICATION

This application claims priority of U.S. Provisional Application Ser. No. 60/447,439 filed Feb. 14, 2003.

BACKGROUND OF THE INVENTION

1. Field of the Invention

This invention relates generally to bicycle frame rear suspension systems, and more particularly to a bicycle frame with rear passive suspension configured to elastically deflect predominantly in a vertical direction under normal cycling loads so as to better isolate the rider from road-surface irregularities and roughness, while simultaneously maintaining or improving rigidity in other directions so as to preserve or improve handling.

2. Brief Description of the Prior Art

Many prior art bicycle frames with active suspension designs (those which use dedicated and purpose-built devices for flexibility and/or vibration control) often incorporate a spring to soften the ride. Active suspensions, although common on off-road mountain bicycles, typically add too much weight and reduce power transmission under hard pedaling for high-performance road bicycles and other applications where weight, simplicity, and pedaling efficiency are critical.

Many prior art bicycle frames with passive suspension designs rely on the flexibility of curved seat stays to soften the ride. However, the amount of flexibility in curved seat stays is typically quite limited (almost insignificant by comparison to the compressive flexibility of pneumatic rear tires) because of high material stresses, the possibility of bucking slender members under compression, and also because the right and left seat stays can flex at different rates depending on direction of wheel load. If curved seat stays are designed and fabricated to be sufficiently elastic as to permit a significant amount of rear wheel travel, one side of the rear wheel's axle would travel vertically a greater distance than the other side when the rider leans the bicycle from side to side as when sprinting or climbing (because this rider-induced action creates transverse loads applied at the bottom of the tires where they contact the road). This transverse load at the rear tire would flex the rear curved seat stays at different rates throwing the rear wheel out of alignment with the bicycle's frame; which would make a bicycle inefficient and hard to control when pedaling out of the saddle while climbing or sprinting.

Some recently developed bicycle frame designs use carbon fiber seat stays in place of metal to soften the ride, but are too stiff in compression to adequately flex to isolate the rider from vibration other than those of very low amplitude.

Another recently developed frame design, known as a "Beam Bicycle", relies on a flexible cantilever beam to suspend the rider's saddle. These designs are effective in isolating the saddle, but do not isolate the bottom bracket and hence the pedals, thus allowing much of the road vibration to reach the rider's legs. Additionally, these frames are typically heavier because they must resist the high bending forces created by cantilevering much of the rider's weight from near the head tube of the frame. Another disadvantage of this design is that the cantilever suspension system depends on varying the distance between the saddle and the bottom bracket, thus the pedaling forces promote rider bounce, which is inefficient.

Nicol, U.S. Pat. No. 3,966,230 discloses a bicycle frame formed of lightweight, high strength relatively large diameter metal tubing, such as titanium, provided with integral stiffeners at the top of the seat tube, the bottom of the down tube and the top of the fork blades. In larger sizes of frames, stiffeners may also be included at the bottom of the seat tube and at the top of the down tube. The placement of stiffeners at these selected locations results in overall frame stiffness characteristics not previously considered achievable without substantial increase in the weight of the frame.

Klein, U.S. Pat. No. 4,621,827 discloses a lightweight bicycle with two chainstay tubes made of tubing of unequal rigidity, specifically the chainstay tube on the chain or drive side is made heavier, while the other chainstay tube is lightened, in order to increase power train efficiency by reducing the magnitude of frame deflection caused by chain stress. In the preferred embodiment, the metal that is added to the chain side chainstay tube is taken from the non-drive side so that there is no net addition of weight Kerr, U.S. Pat. No. 5,240,269 discloses a bicycle suspension device employed between the rear wheel and the frame of a mountain bike. A lever arm pivoted to the frame carries the rear wheel at one end and the suspension device at the other. The rear wheel portion of the lever arm is about four times as long as is the suspension device portion. The suspension device includes a hollow elongated elastomeric spring carrying an aluminum telescoping portion. The telescoping portion supports the elastomer while allowing reciprocating movement along a major axis, but not allowing any rotational movement around that same axis.

Klein et al, U.S. Pat. No. 5,586,780 discloses an improved bicycle suspension system including a rotary damper and composite springs which closely control the direction of allowable movement in the suspension to preclude rocking, twisting or unwanted lateral deflections.

Chou, U.S. Pat. No. 5,593,168 discloses a bicycle frame with shock absorbing system that eliminates the shocking force occurring on the connecting portion of a seat tube fixedly mounted on a bottom bracket and a down tube. The system includes a shock absorber mounted between the seat tube and the down tube, a pair of brackets integrally formed with bottom bracket extend toward the down tube. A pivot is fixedly secured to the brackets and a pivot mounting tube is integrally formed on a rear end of the down tube and pivotally mounted on the pivot.

Kirk, U.S. Pat. No. 6,109,637 discloses a bicycle frame that uses existing seat stay members as a spring, and absorbs high frequency, low amplitude vibration with effective damping. Each seat stay is connected at a top end to the seat tube, and pivotally connected at the bottom end to the rear drop out, and has a circular arcuate curvature adjacent the bottom end with a radius of between about 11–16 inches and subtending an angle of between about 20–60 degrees. A damping/spring constant increasing element, comprising a metal strip bonded to elastomeric material (such as silicone) having a durometer between about 20–70 Shore A, is bolted to the seat stay convex arcuate portion, and can be replaced with a unit having a different durometer to adjust the spring force constant for rider weight, riding style, road or terrain conditions, or the like.

The present invention is distinguished over the prior art in general, and these patents in particular by a bicycle frame having a rear passive suspension system configured to elastically deflect predominantly in a vertical direction under normal cycling loads so as to better isolate the rider from road-surface irregularities and roughness, while simultaneously maintaining or improving rigidity in other directions so as to preserve or improve handling. The frame has a pair of upper chain stays that control the rear wheel motion rigidly in five of the six degrees of freedom with stiffness comparable to existing road bicycle designs, while simultaneously allowing deflection of the tubular members and a significant amount of vertical movement of the rear wheel for ride compliance in order to improve handling, comfort, and safety.

SUMMARY OF THE INVENTION

It is therefore an object of the present invention to provide a bicycle frame having a rear passive suspension system that effectively isolates the rider's saddle and pedals from lowamplitude to moderate-amplitude high-frequency vibration.

It is another object of this invention to provide a bicycle frame having a rear passive suspension system that significantly reduces maximum forces transmitted to the rider when striking objects or potholes.

Another object of this invention is to provide a bicycle frame having an integral rear passive suspension system that is laterally stiff for improved power transmission.

Another object of this invention is to provide a bicycle frame having a rear passive suspension system wherein the suspension stiffness can be increased quickly and easily by installation of a stiffener insert.

Another object of this invention is to provide a bicycle frame having a rear passive suspension system wherein the down tube and seat tube stresses can be quickly and easily reduced or limited by installation of a stiffener insert, which can also limit rear wheel travel.

A still further object of this invention is to provide a bicycle frame having an integral rear passive suspension system that can be manufactured from conventional materials, such as titanium, carbon fiber, steel, aluminum, etc.

A still further object of this invention is to provide a bicycle frame having an integral rear passive suspension system that is lightweight, has no moving parts, and is inexpensive to manufacture using existing fabrication techniques and equipment.

Other objects of the invention will become apparent from time to time throughout the specification and claims as hereinafter related.

The above noted objects and other objects of the invention are accomplished by a bicycle frame having a rear passive suspension system configured to elastically deflect predominantly in a vertical direction under normal cycling loads so as to better isolate the rider from road-surface irregularities and roughness, while simultaneously maintaining or improving rigidity in other directions so as to preserve or improve handling. The frame has a pair of upper chain stays that control the rear wheel motion rigidly in five of the six degrees of freedom with stiffness comparable to existing road bicycle designs, while simultaneously allowing deflection of the tubular members and a significant amount of vertical movement of the rear wheel for ride compliance in order to improve handling, comfort, and safety.

BRIEF DESCRIPTION OF THE DRAWINGS

FIG. 1 is a side elevation of a bicycle frame having a rear passive suspension system in accordance with the present invention.

FIGS. 7–10 are longitudinal cross sections of various stiffener inserts that may be placed inside the seat tube.

FIG. 11 is a side elevation of a contoured stiffener insert that may be placed inside the seat tube.

FIG. 12 is a side elevation of a tool that may be used to install and remove the stiffener insert.

DESCRIPTION OF THE PREFERRED EMBODIMENTS

Figure 2:
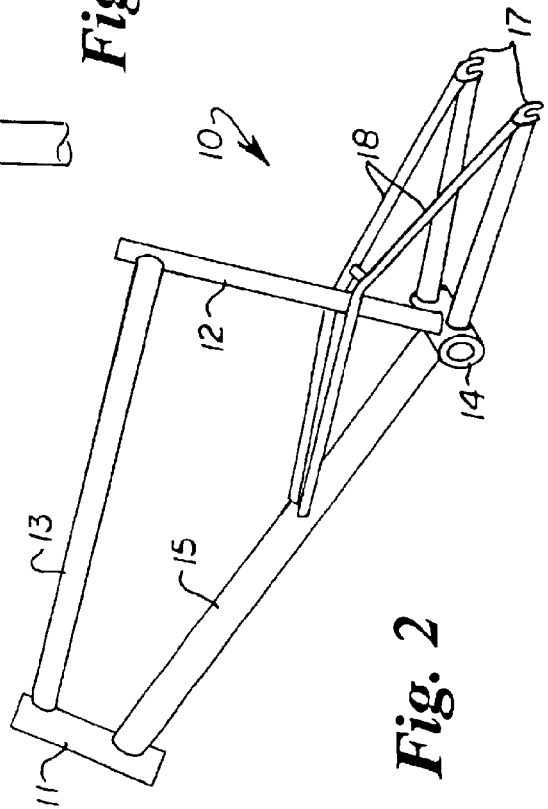
FIG. 2 is a perspective view of the bicycle frame with rear passive suspension more clearly showing the arrangement of the upper chain stay members.
Figure 3:
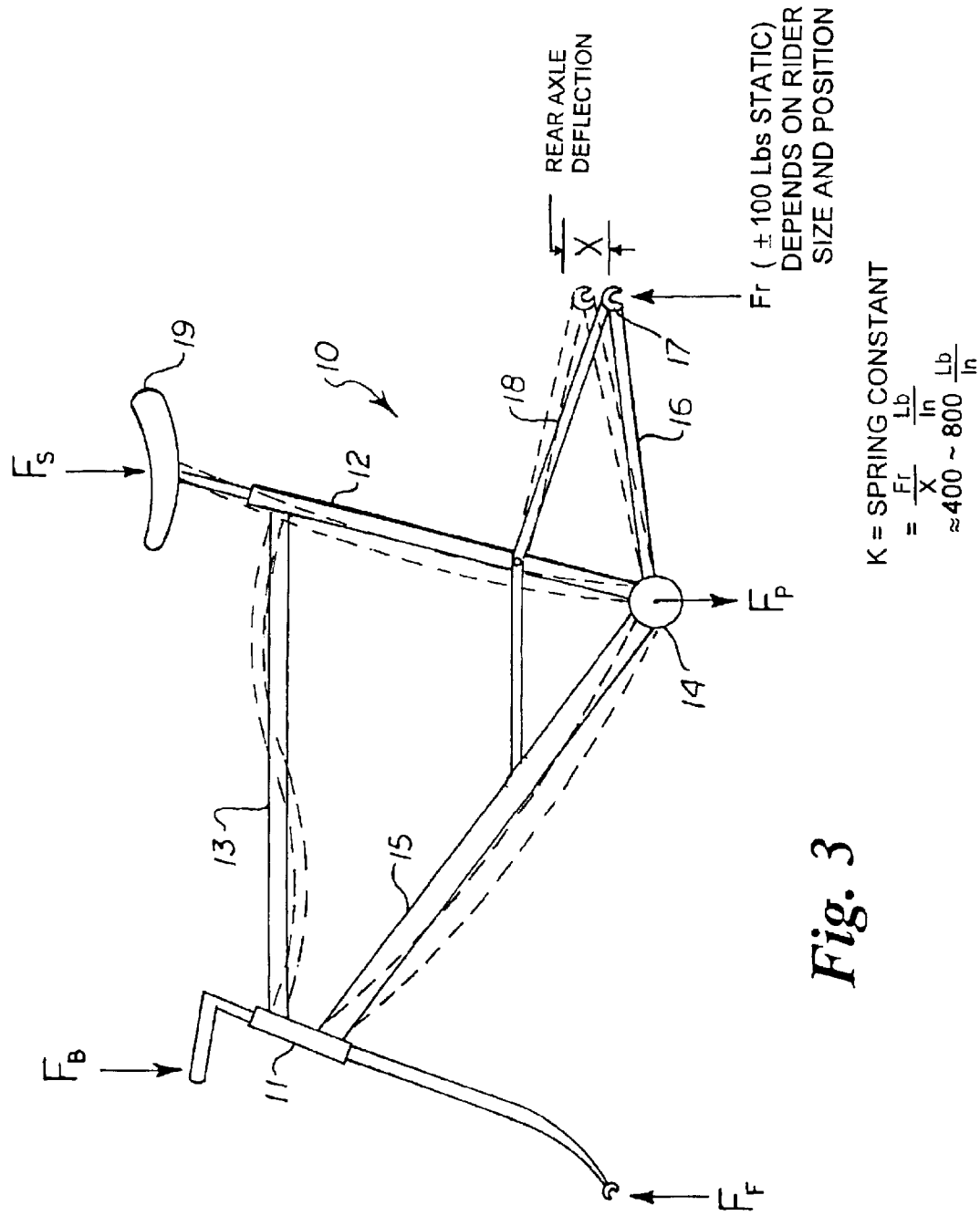
FIG. 3 is a side elevation of the bicycle frame with rear passive suspension, showing the deflection of the frame, somewhat schematically and exaggerated in dashed line.

Referring to the drawings by numerals of reference, there is shown in FIGS. 1–3, a preferred bicycle frame 10 having a rear passive suspension system in accordance with the present invention. The present frame 10 has a head tube 11, a seat tube 12, a top tube 13 extending therebetween, a bottom bracket shell 14 at the bottom end of the seat tube, a down tube 15 extending angularly between the head tube and the bottom bracket shell, a pair of laterally spaced lower chain stay members 16 extending rearwardly from the bottom bracket shell, and a pair of laterally opposed rear wheel dropout brackets 17, one at the rear end of each lower chain stay member.

The present bicycle frame 10 eliminates the seat stays of a conventional road (or similarly designed cyclocross, hardtail mountain, hybrid, or city) bicycle frame and adds a second set of laterally spaced chain stays 18 (hereinafter referred to as upper chain stays 18) that connect the rear wheel with the bottom portions of the seat tube 12 and down tube 15 so as to place the seat tube and down tube (and to a lesser degree, the top tube 13) in bending when vertical loads are applied to the saddle 19 and/or bottom bracket 14 by the rider. To minimize stresses on the frame's tubes for a given amount of desired rear-wheel deflection, it is preferred to connect the upper chain stays 18 to the seat tube 12 and down tube 15 as low as practical while maintaining pleasing aesthetics and allowing for necessary clearances for other functional parts of the bicycle. Although the upper and lower chain stays may be combined into one functional member, keeping them separate minimizes weight, adds to lateral stiffness, and provides a means to limit rear wheel travel through the use of an insert at the base of the seat tube. In the preferred arrangement, the upper chain stays 18 are attached or secured at one end to the rear wheel dropout brackets 17, extend angularly upward and forward therefrom, and are secured to the seat tube 12 intermediate their length just above the front derailleur, and then extend and converge from the seat tube, and are secured to the down tube 15.

As shown somewhat schematically in FIG. 3, the arrangement described above flexes the seat tube 12 the greatest amount approximately 7 inches above the bottom bracket shell 14. The flexure is shown exaggerated in dashed line. Unlike other passive suspension approaches which rely on flexing the relatively small seat stays to cushion the rider from rough road surfaces, the present design relies on flexing the larger seat tube 12 and down tube 15 (and to a lesser degree, the top tube 13) which, when properly loaded, can allow much greater deflection at the rear wheel which in turn can absorb greater energy while remaining in the elastic range of the frame's material. Prototypes fabricated from titanium and steel round tubing have deflected greater than ½-inch as measured from the base of the saddle rails to the rear wheel's axle, which is far greater than conventional frames can flex vertically, and also significantly greater than frames with curved seatstays. Additionally, a frame manufactured with ovalized tubing will be able to flex even more for the same level of material stresses while maintaining or exceeding the lateral and torsional stiffness.

Figure 4:
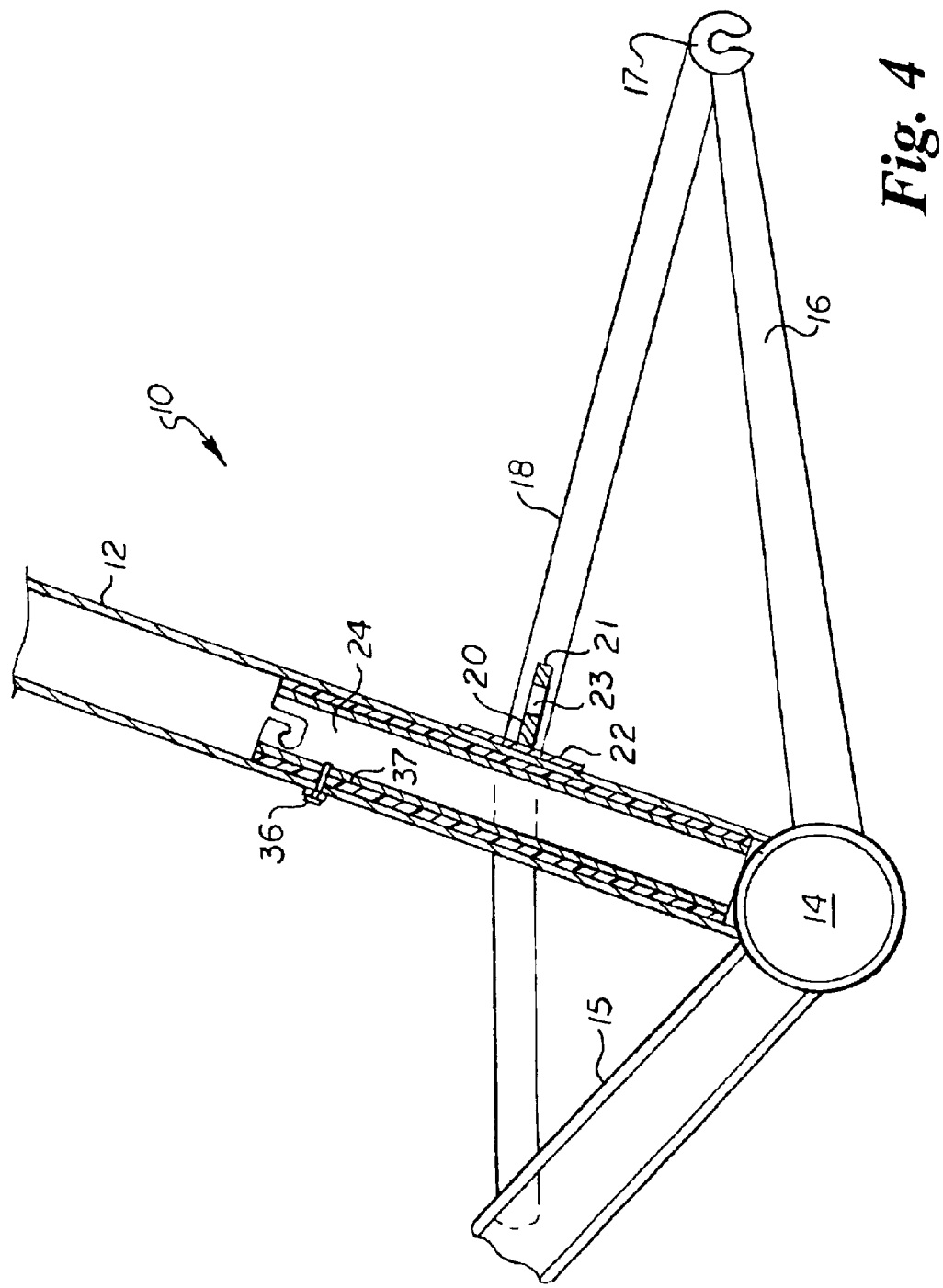
FIG. 4 is a cross sectional view of a portion of the bicycle frame, showing a stiffener insert inside the seat tube.
Figure 5:
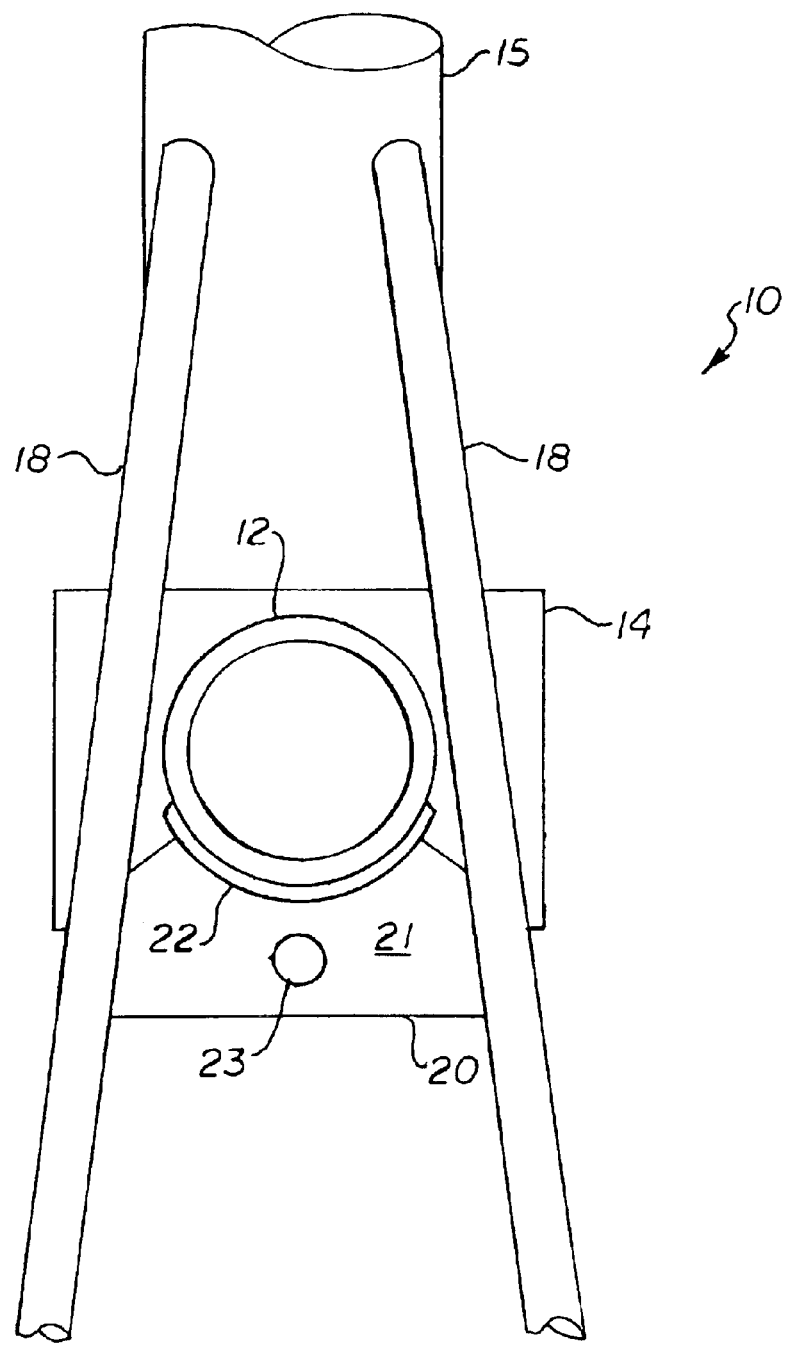
FIG. 5 is a top plan view in partial cross section of a portion of the bicycle frame, showing the rear brake caliper bridge utilized as a gusset.

In its simplest form, when the frame is constructed of metal tubing (titanium, steel, aluminum, etc.), the upper chain stays 18 may be welded to the seat tube 12 and down tube 15, however in a preferred embodiment, as shown in FIGS. 4 and 5, the rear wheel brake bridge 20, on which the rear brake caliper is mounted, is modified to serve as a force-distributing gusset to tie the two upper chain stays 18 to the seat tube 12 in a manner that lowers point-to-point stresses. This is accomplished by welding a plate 21 between the laterally spaced upper chain stays 18 and providing an arcuate metal reinforcement pad 22 at the forward end thereof which is welded to the seat tube 12. The plate 21 is provided with a hole 23 near its rearward end for mounting the rear brake caliper. It should also be noted that when side-pull brakes (more commonly used on cyclocross, mountain, and tandem bicycles) are preferred in lieu of caliper brakes (more commonly used on road bicycles), brake bosses can be welded to the top of the upper chain stays to attach the side-pull brakes at a location where they are convenient to access; and where they will not interfere with other functional parts of the bicycle.

Figure 6:
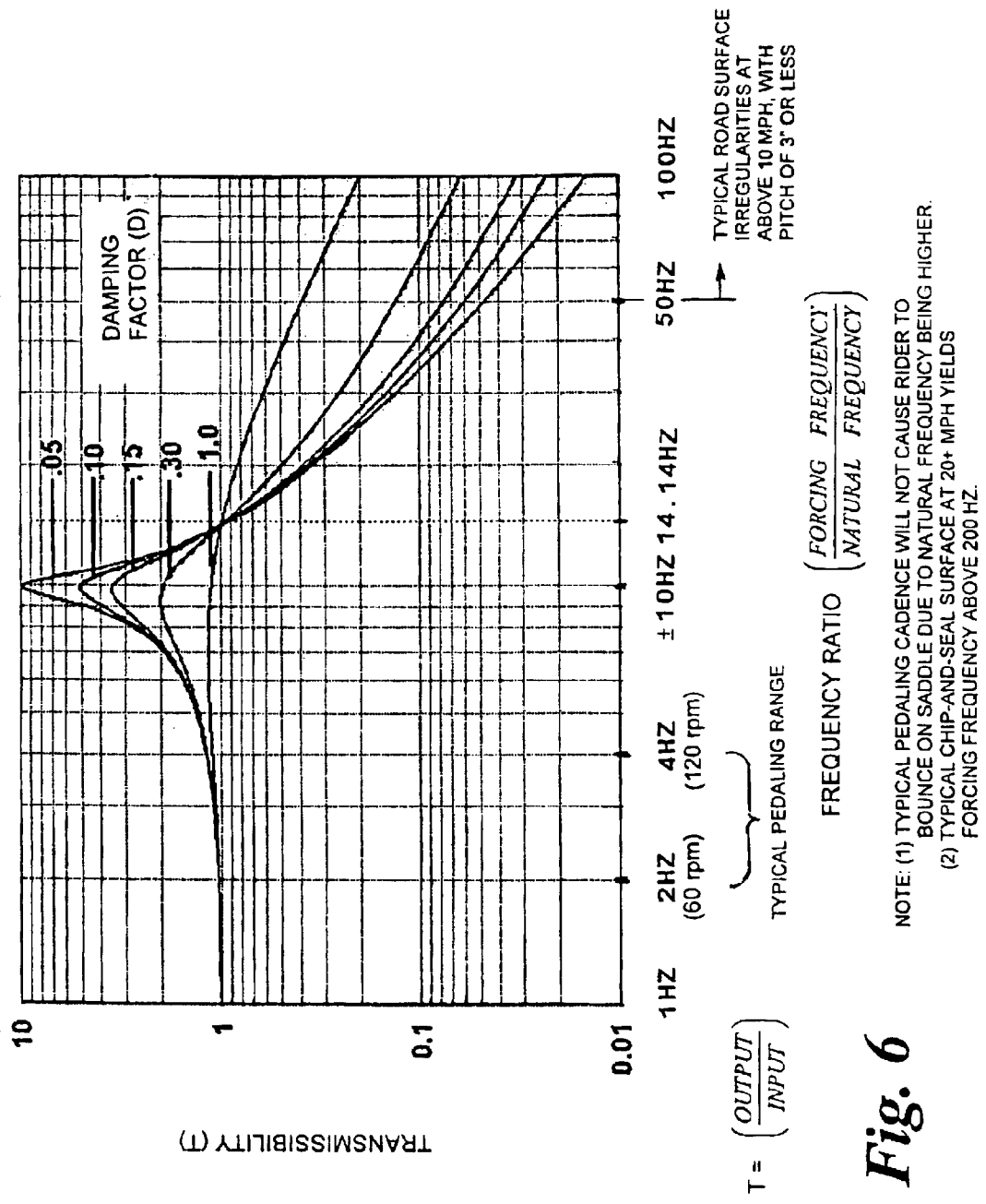
FIG. 6 is a graph illustrating isolation of rear wheel movement to the rider as a function of input frequency showing the effect of pedaling speed and natural frequency of the bicycle's suspension for a given rider mass.

One of the major goals of the present invention is to make the frame as vertically compliant as possible while preventing the rider from inducing a "bouncing" effect in the saddle; which is typically caused by forces generated during the pedaling action. Referring now to FIG. 6, when the frequency of the pedaling forces are close to, or coincide with, the natural frequency of the bicycle's suspension for a given rider mass, the rider will bounce excessively, making it uncomfortable and inefficient to pedal. Since experienced and accomplished riders typically spin their legs at a higher cadence than beginners and novice riders, the higher maximum cadences for experienced riders in the range of 120 revolutions per minute is used as a starting point for design of the frame. It should be noted that pedaling forces that affect "rider bounce" fall into two main categories; those associated with applying forces to the pedals for power generation, and those caused by forces generated by rider inertia (i.e.—rider leg mass moving up and down). In the present design, unlike beam-type bicycles, the distance from the saddle to the bottom bracket is essentially fixed, hence forces applied to the pedals to generate power, which in turn affect saddle loads, do not cause rider bounce. Pedaling forces merely place the seat tube in more or less compression.

However, inertia forces generated by rider leg mass moving up and down load and unload the rear wheel with each leg stroke. By fabricating the frame just stiff enough to make the natural frequency (for a given rider mass) of the rear suspension approximately twice as high (or slightly greater than twice) as the maximum pedaling frequency, the suspension will isolate the rider while contributing minimal movement amplification due to the pedaling action.

It should be noted that inertia forces generated by rider pedaling action also affect conventional bicycle designs. However, on a much vertically stiffer conventional frame, inertia forces load and unload the rear tire to a greater degree due to pedaling because the frame does not flex as much to maintain a steadier load on the tire. At high rider pedaling cadences, inertia forces unload the tires of a conventional bicycle to a greater degree, making it easier for the tires to lose traction during hard cornering when the rider pedals through the turns.

It has been determined that when the rider's pedaling frequency is in the range of 60 percent or lower of the natural frequency of the bicycle's suspension, there is insignificant amplification of the movement caused by pedaling forces. By designing for the highest likely pedaling cadence, the rider will never approach the natural frequency of the suspension, which could cause bouncing. Novice riders and those who prefer to spin slower may benefit additionally from a bicycle specifically designed with a lower spring constant and, hence, a softer and more compliant ride.

It has also been determined that when the forcing frequency is much higher than the bicycle's suspension natural frequency, there is significant isolation of vibration; hence the vast majority of low-amplitude to moderate-amplitude high-frequency wheel travel is not transmitted to the rider.

Occasional and non-repeating high amplitude wheel travel (as when a rider inadvertently strikes a large object or pothole) will flex the frame further as it absorbs the impact's energy, thereby reducing the maximum force transmitted to the rider compared to vertically rigid frames which must rely mostly on tire and wheel deflection to absorb most of the impact. Lower maximum forces at the rear tire and wheel, when striking objects and potholes, should result in fewer pinch flats when riding on clincher tires, and should result in fewer broken spokes and other wheel damage.

In order to achieve a spring constant for a natural frequency of oscillation for the rider of just above 4 cycles per second (a maximum cadence of 2 revolutions per second and 2 pulses per revolution, one per leg), the frame must deflect statically at the rear wheel in the range of ¼-inch just under the rider's weight when in the normal cycling position; which is much greater than typical road bicycle frames deflect under similar loads.

By using modern materials with a high strength to modulus of elasticity ratio, the frame can be designed and fabricated to remain in the elastic limits of the materials under normal use while having a natural frequency in the order of about 6 to about 10 cycles per second, which is high enough to prevent resonance induced by the rider's pedaling action, but low enough to permit isolation of vibrations commonly encountered while riding on roads. Thus, the frame will effectively isolate the rider from much of the low-amplitude and moderate-amplitude high-frequency vibrations caused by road roughness—as in chip-and-seal pavement—which are normally encountered in the range of 200 cycles per second or higher. A typical accomplished rider traveling at 20 miles per hour or higher (approximately 30 feet per second) will experience undulations caused by chip-and-seal pavement, pavers, or cobblestones, at a frequency many times greater than the natural frequency of 6 to 10 cycles per second of the suspended rider. As can be seen from the graph on isolating vibrations (FIG. 6), when the forcing frequency is much higher than the natural frequency of the object, only a small portion of the forcing amplitude reaches the isolated mass; in this case the rider. Hence, small undulations on the surface of the pavement will result in much smaller undulations at the bicycle's saddle and bottom bracket.

Although the use of high-strength-to-modulus-of-elasticity materials will allow a properly designed and fabricated frame to flex well above ½-inch at the rear wheel, it may be possible to overstress the frame if unexpected large potholes or debris is struck repeatedly while riding; which could lead to permanent deformation or fatigue failure. To prevent this from happening during casual and training rides, a lightweight tubular cartridge stiffener insert 24, as seen in FIG. 4, may be removably installed inside of the seat tube 12 at its base to add stiffness, limit total rear wheel travel, and/or add damping as desired, so as to prevent damage.

The stiffener insert 24 may be fabricated from carbon fiber, aluminum, titanium, steel or any combination of suitable materials and can be easily installed inside the seat tube 12 at its base by removing the saddle and seat post. The insert 24 shown in FIG. 4 and also in FIG. 7 is a hollow tubular member having two opposing J-slots 25 at its top end and is surrounded by an outer layer or liner 26 formed of shock absorbing material, such as butyl, highly-damped silicon, or other similar materials—for riders preferring to tune the ride by adding some damping.

FIGS. 8–11 show various alternate insert configurations. FIG. 8 shows a hollow tubular insert 24 formed of a suitable metal or composite material having two opposing J-slots 25 at its top end and does not have an outer layer or liner. FIG. 9 shows a hollow tubular insert 27 formed of a suitable metal or composite material having two opposing J-slots 25 at its top end and a radial flange 28 at its top and bottom ends. An outer layer or liner 26 formed of shock absorbing material surrounds the midportion of the insert between the top and bottom flanges 28. In this embodiment, the radial flanges 28 engage the interior of the seat tube, but the outer liner 26 does not. Thus, the liner will not contact the seat tube under initial deflection, thereby isolating the rider from low-amplitude vibration, but will provide damping upon larger deflections.

FIG. 10 shows a hollow tubular insert 27 formed of a suitable metal or composite material having two opposing J-slots 25 at its top end and a radial flange 28 at its top and bottom ends and does not have an outer layer or liner. In this embodiment, the radial flanges 28 engage the interior of the seat tube, but the midportion of the insert between the flanges does not. Thus, the insert will not resist initial deflection of the seat tube, but will resist beyond a certain deflection depending upon the distance the radial flanges extend beyond the main portion of the insert.

FIG. 11 shows a tubular insert 29 formed of a suitable metal or composite material having straight top and bottom end portion 30 with two opposing J-slots 25 at its top end and a circumferential concave midportion 31 that curves longitudinally outward from its center to the end portions. In this embodiment, the end portions 30 engage the interior of the seat tube, but the contoured midportion 31 does not. Thus, the insert will provide progressive resistance of deflection of the seat tube.

FIG. 12 shows a hand tool 32 which may be used to install, position, and/or remove the inserts. The tool 32 has an elongate shank 33 with the T-shaped top end 34 sized to be gripped by the hand of the user, and an inverted T-shaped bottom end 35 which is sized to be slidably received inside of the seat tube and engaged in the J-slot 25 at the top end of the insert. The inserts can be easily removed from the seat tube by removing the saddle and seat post, inserting the T-shaped bottom end 35 of the tool 32 into the seat tube and J-slot, rotating it to engage the J-slot, and lifting the insert out. Thus, the insert can be easily removed for personal tuning and/or for racing so as not to have a weight penalty.

It should be understood that a similar approach to install and remove an insert, where the "J" slots are on the tool and the pin is incorporated in the insert, is also possible.

It should be understood from the foregoing, that various insert can also be designed to increase the spring constant for heavier riders or those who may prefer a slightly stiffer ride. Riders who tour on loaded bicycles can easily and inexpensively adjust the suspension's stiffness relative to the load to maintain ride comfort and to prevent overstressing the frame. It should also be understood that the inserts can be installed in combination to increase performance. For example, a first plain round tubular insert as shown in FIG. 8 may be installed inside the seat tube to stiffen the seat tube for a heavier rider, and a second different type of insert (FIGS. 7 or 9–11) may be installed on the inside of the first insert to limit travel, add damping, etc.

By carefully selecting the cross-sectional shape of the insert (making it non-round), it is possible to add significantly more lateral stiffness than vertical stiffness to the frame. This could prove most beneficial to lightweight yet very powerful riders who are strong enough to flex a frame laterally with their pedaling action.

Referring again to FIG. 4, the insert 24, particularly when non-round or asymmetrical, can be affixed at the bottom portion of the seat tube 12 by one of the bolts 36 of a water bottle cage to prevent the insert from rotating or moving up inside the seat tube; where it would not serve its intended use. This is accomplished by providing a small hole 37 in the upper section of the insert to allow the bolt 36 to pass through the side wall of the insert, thereby preventing the insert from rotating or moving up. The tool 32 described above may be used to position the insert to align the hole with the bolt when installing the bolt.

Because the present frame design relies on predominantly loading and therefore flexing the seat tube and down tube (and to a lesser degree, the top tube) in a controlled direction along the centerline of the frame, it is possible to further optimize frame performance for a given suspension stiffness by using tubing of varying shapes, wall thicknesses, and/or properties. Varying the cross section of the seat tube and down tube (and to a lesser degree, the top tube) will impact the vertical versus lateral stiffness of the frame.

Figure 13:
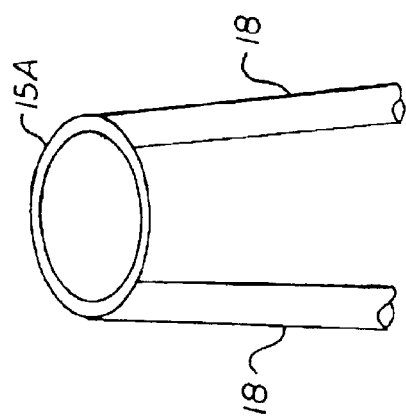
FIG. 13 is a top plan view in partial cross section of an elliptical down tube of the bicycle frame.

For example, FIG. 13 shows a down tube 15A having an elliptical transverse cross section with the major axis extending between the lateral sides. If the seat tube and down tube are made of elliptical (or similar) versus round tubing, they would flex easier in one direction so greater wheel travel could be incorporated into the design without overstressing the frame. However, elliptical (or similar) tubing with the major axis extending laterally to increase vertical compliance may increase aerodynamic drag somewhat.

Figure 14:
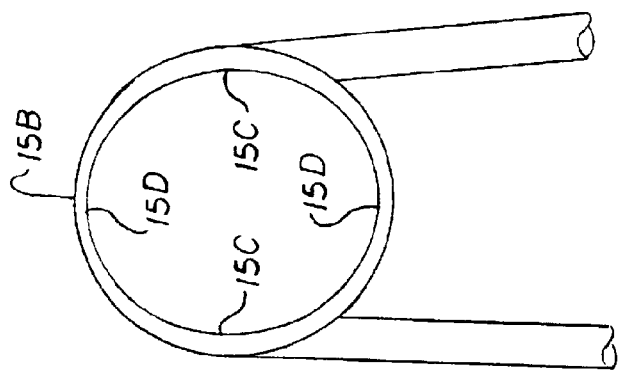
FIG. 14 is a top plan view in partial cross section of a down tube of the bicycle frame having thicker and thinner side wall portions.

FIG. 14 shows a down tube 15B having a side wall with lateral sides 15C that are thicker than the front and rear sides 15D. Using a seat tube and down tube with thicker walls at the sides of the bicycle and with thinner walls at the front and back will result in a frame with greater vertical compliance while laterally stiffer. The same can be accomplished with nonuniform anisotropic materials like carbon fiber by varying its properties between the right and left sides of the tubes and the front and back.

Similarly, variations in wall thickness along the length of the seat tube and down tube can optimize frame weight and performance. In the preferred arrangement described previously, the maximum stresses in bending due to vertical loads on the bicycle are near the bottom of the seat tube and down tube. Hence, making the tubes of thicker walls near the bottom compared to the top will distribute stresses more uniformly along the tube for a given amount of rear wheel travel, and will therefore minimize maximum stresses.

Although this invention has been described above in detail predominantly for single road bicycles, the same principles can be applied to cyclocross, hardtail mountain, hybrid, city, and tandem bicycles in order to accomplish the same results. For use as one of these where significantly higher wheel loads are commonly applied, a stronger and stiffer insert can be used along with rear-brake bosses above the upper chainstays for mounting of side-pull brakes. Although this invention is not meant to substitute for a full-suspension mountain bicycle frame, it can soften and therefore improve the ride quality of a "hardtail" mountain bicycle without the added costs, weight, pedaling-inefficiencies, and complexity of full active suspension, and thus offers an intermediate option to bridge between a conventional hardtail bicycle and an active full-suspension bicycle.

Figure 15:
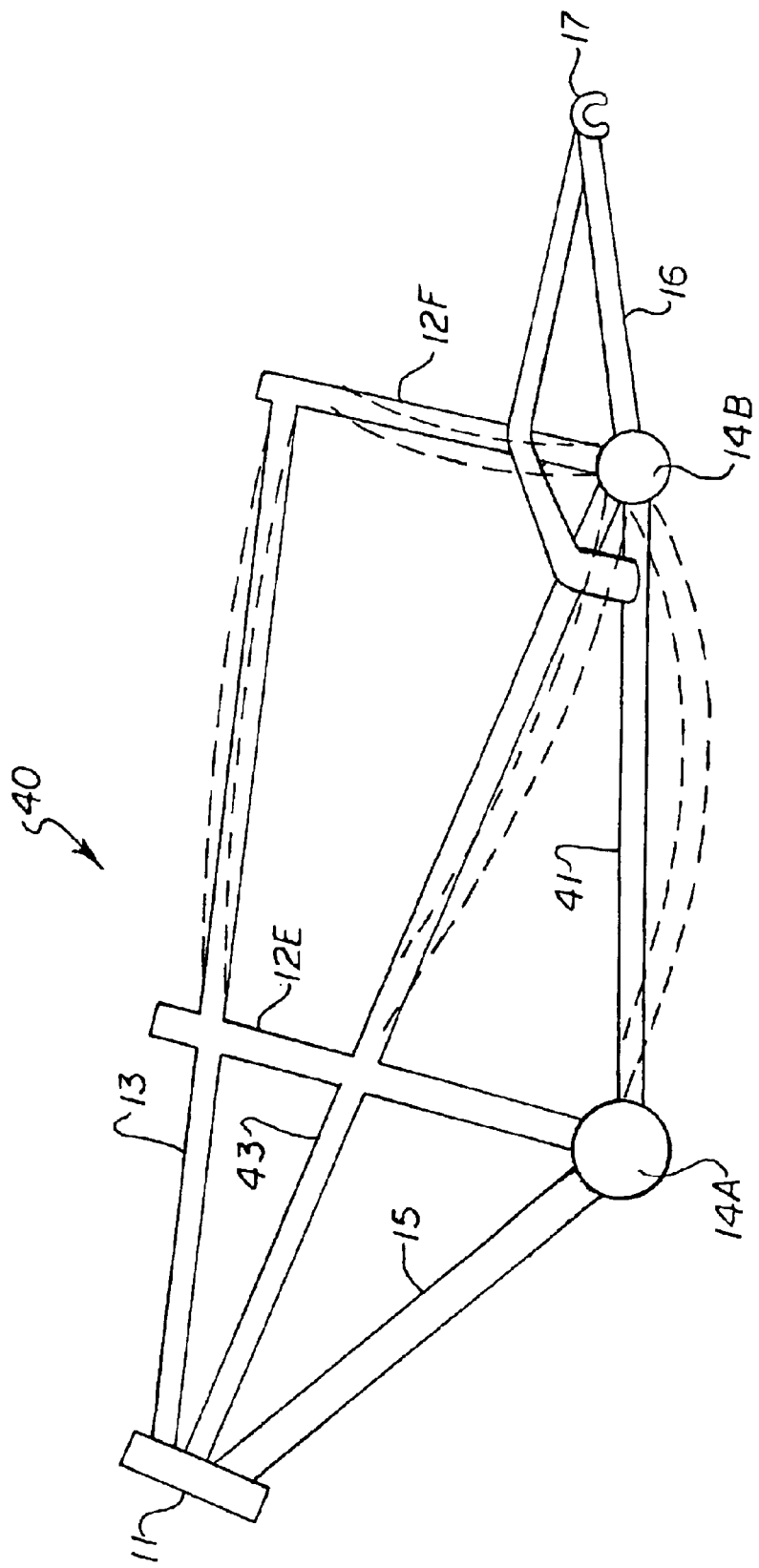
FIG. 15 is a side elevation of a tandem bicycle frame with rear passive suspension, showing the deflection of the frame, somewhat schematically and exaggerated in dashed line.

FIG. 15 shows a tandem bicycle frame 40 having a rear passive suspension system in accordance with the present invention. In this embodiment the down tube 15 of the frame is connected with the bottom bracket shell 14A at the bottom of the front seat tube 12E and a bottom tube 41 is connected between the front bottom bracket shell to the rear bottom bracket shell 14B at the bottom of the rear seat tube 12F. A rear lateral tube 43 extends angularly downward from the front seat tube 12E to the rear bottom bracket shell 14B. A pair of upper chain stays 18A connect the rear wheel with the bottom portions of the rear seat tube 12F, the rear lateral tube 43, and the bottom tube 41 so as to place them in bending when vertical loads are applied to the saddles and/or bottom brackets by the riders. In the preferred arrangement, the upper chain stays 18A extend angularly upward from the rear wheel dropouts 17 and are attached or secured to the rear seat tube 12F just above the derailleur and curved at their juncture with the rear seat tube to extend angularly downward to adjoin the rear lateral tube 43, and then downwardly therefrom to intersect at the bottom tube 41.

It should be understood that the upper chain stays 18A may be connected to either the bottom tube 41 or the rear lateral tube 43 only, rather than both; depending on the stiffness of the tubes in order to achieve the desired compliance. It should also be understood that the seat, rear lateral, and bottom tubes can be tied together near the rear bottom bracket in numerous ways to facilitate fabrication; including the use of a vertical gusset(s) running parallel to the centerlines of the tubes.

As shown somewhat schematically in FIG. 15, the upper chain stays 18A flexes the rear seat tube 12F, the rear lateral tube 43 and the bottom tube 41. These tubes will flex slightly to allow the rear wheel to travel vertically approximately ¼-inch under normal static load. The flexure is shown exaggerated in dashed line. Since tandem riders spin at approximately the same cadence as single riders, the natural frequency of the rear suspension is designed for the same range of from 6 to 10 cycles per second. However, since the mass of a tandem bicycle and two riders is generally much higher than a single's, the spring constant must be proportionally higher.

As with the single bicycle frame embodiment, the maximum stresses can be minimized by proper selection of tube shapes and properties so as to not exceed their elastic limits. An insert, as described previously, can also be installed in the rear seat tube 12F at its base to add stiffness, limit total rear wheel travel, and/or incorporate damping.

Rear passive suspension can be of great value to tandem riders, particularly the stoker (rear rider), since it is much more difficult to stand while riding a tandem, which makes saddle soreness more common. Additionally, it is more difficult for stokers to anticipate bumps in the road—since they don't normally see them—in order to unload the saddle. Even when they anticipate the bump and unload the saddle by standing, they feel the jolt of the bump through the legs.

The present rear passive suspension, although not the only way to accomplish the intended results of building-in a significant amount of passive rear wheel travel by flexing the seat tube and down tube (and to a lesser degree, the top tube) in a controlled manner, has many advantages as set forth below.

The present frame cushions the ride and improves traction by permitting a significant amount of rear-wheel vertical travel compared to typical high-performance road bicycles; and even more compliance compared to inexpensive bicycles manufactured from heavy tubing. The frame does not add weight or complexity, and requires no additional level of service or maintenance beyond that which is normal for a road bicycle. The simple and low-cost design can be manufactured with existing tooling, materials, procedures, and manufacturing knowledge, and at a comparable cost.

Also unlike many designs that rely merely on flexing the small seat stays, the present design controls both sides of the rear wheel axle equally. Curved seat stays as used on many bicycle designs, if made sufficiently flexible, can allow one side of the rear wheel axle to move vertically relative to the other, which does not maintain the rear wheel in alignment with the bicycle's frame; thus adversely affecting handling.

The present design allows the rear wheel greater vertical travel compared to frames that merely rely on flexure of the seat stays, and permits the vertical spring constant to be low enough to effectively isolate the rider from much of the vibration caused by variations in chipand-seal asphalt and other surface irregularities such as expansion joints, while still controlling the rear-wheel in the other five degrees of motion to preserve or improve handling.

The present frame design provides enough rear wheel travel while remaining in the elastic limits of the frame material to result in a suspension spring constant low enough that it will allow a natural frequency of vibration for the rider that is just higher than that which he/she induces while pedaling at the highest likely cadence, or approximately 120 revolutions per minute for accomplished riders. By doing so, it will cushion the ride as much as possible while keeping the rider from "bouncing" in the saddle regardless of what cadence he/she elects to ride at, thereby preserving pedaling efficiency.

The present frame design not only isolates the rider's buttocks from road surface irregularities, but unlike beam designs, it also isolates the rider's legs by suspending, and therefore isolating, the bottom bracket and connected pedals from surface irregularities which would otherwise cause additional vibration and rider fatigue.

By not damping rear wheel travel, or by doing so lightly, the present rear passive suspension system is better able to isolate the rider from low-amplitude and moderate-amplitude high-frequency vibration likely to be encountered repeatedly during road cycling while traveling on rough surface pavement (unlike off road cycling which benefits from heavy damping to control excessive wheel motion while riding repeatedly over large objects).

By replacing conventional seat stays with the present upper triangulated chain stays, the laterally unsupported effective length of the down tube is reduced, making the frame laterally stiffer which improves power transmission to the rear wheel when the rider is pedaling hard during out-of-the-saddle climbing or sprinting. Having the upper chain stays connect the seat tube and down tube at a location just above the bottom bracket shell increases bottom-bracket stiffness for improved pedaling efficiency.

By replacing the conventional seat stays with the present upper triangulated chain stays, and by lowering the rear brake caliper, the frame's center of gravity is lowered for improved handling; and by lowering the rear brake caliper, the frame's cross section to the wind is reduced, making it more aerodynamic. Utilizing the rear wheel brake bridge as a force-distributing gusset to tie the upper chain stays to the seat tube lowers point-to-point stresses.

By connecting the upper chain stays to the seat tube and down tube just above the front derailleur, the horizontal chain-tension loads are distributed between the lower (conventional) chain stays and the upper chain stays. Because the right lower chain stay does not have to carry the vast majority of the chain tension in compression on its own, it can be made horizontally thinner in cross section which allows the inside chain ring to be placed closer to the bicycle's centerline. This possible reduction in "Q" factor (the lateral distance between the pedals) improves pedaling efficiency and/or may allow the installation of a triple chain ring crankset without having to install a longer bottom bracket axle for chain ring clearance.

Unlike beam bicycle frames, the distance from the saddle to the bottom bracket of the present frame is not significantly affected by pedaling forces, thereby further reducing pedalinginduced bouncing. Also unlike beam bicycle frames, the present frame allows two water bottle cages to be mounted on the seat tube and down tube in approximately the same location as on standard bicycles. Additionally, on larger frames a third water bottle cage can be installed behind the seat tube just above the rear tire in the space where a conventional frame's seatstays pass.

By incorporating significant vertical compliance into the frame design, maximum forces are reduced when inadvertently striking objects or potholes, thereby reducing the incidence of pinch flats and wheel damage.

Although the preferred embodiment of the present invention has been described as having upper and lower chain stay members, it should be understood that they may be combined into one functional member. For example, a single pair of chain stay members may be connected at a forward end with the bottom bracket shell so as to allow slight rotation thereof about a horizontal axis whereby the single pair of chain stays control rear wheel motion predominantly in a vertical direction and allow a predetermined amount of elastic deflection of the seat tube and the down tube to isolate the rider from road-surface irregularities and roughness, while maintaining rigidity in other directions to improve handling, comfort, and safety.

While this invention has been described fully and completely with special emphasis upon preferred embodiments, it should be understood that within the scope of the appended claims the invention may be practiced otherwise than as specifically described herein.

What is claimed is:

1. A bicycle frame having a rear passive suspension system, comprising:

a bicycle frame having a top tube, a seat tube extending downwardly from one end thereof, a bottom bracket shell at the bottom end of said seat tube, a down tube extending angularly upward and forward from said bottom bracket shell, a pair of lower chain stay members extending rearwardly from said bottom bracket shell, and a pair of laterally opposed rear wheel dropout brackets at a rear end of said lower chain stay members; and a pair of laterally opposed upper chain stay members secured at one end to said rear wheel dropout brackets extending angularly upward and forward therefrom and secured to said seat tube a predetermined distance above said bottom bracket shell to stiffen the frame laterally and transfer rear wheel loads to said seat tube;

said upper chain stay members secured to said seat tube a distance above said bottom bracket shell at a point to control rear wheel motion predominantly in a vertical direction and, when subjected to rear wheel loads, place said seat tube in bending at or near said bottom bracket shell and allow an amount of elastic deflection of said seat tube sufficient to isolate the rider from road-surface irregularities and roughness, while maintaining rigidity in other directions to improve handling, comfort, and safety.

2. A bicycle frame having a rear passive suspension system, comprising:

a bicycle frame having a top tube, a seat tube extending downwardly from one end thereof, a bottom bracket shell at the bottom end of said seat tube, a down tube extending angularly upward and forward from said bottom bracket shell, a pair of lower chain stay members extending rearwardly from said bottom bracket shell, and a pair of laterally opposed rear wheel dropout brackets at a rear end of said lower chain stay members; and a pair of laterally opposed upper chain stay members secured at a first end to said rear wheel dropout brackets, extending angularly upward and forward therefrom, secured to said seat tube intermediate their length a predetermined distance above said bottom bracket shell, extending from said seat tube, and secured at a second end to said down tube a predetermined distance adjacent to said bottom bracket shell to stiffen the frame laterally and transfer rear wheel loads to said seat tube and said down tube; wherein said upper chain stay members control rear wheel motion predominantly in a vertical direction and, when subjected to rear wheel loads, place said seat tube and said down tube in bending intermediate their length to reduce stresses at their juncture with said bottom bracket shell and allow an amount of elastic deflection of said seat tube and said down tube sufficient to isolate the rider from road-surface irregularities and roughness, while maintaining rigidity in other directions to improve handling, comfort, and safety.

3. The bicycle frame according to claim 2, wherein said laterally spaced upper chain stay members straddle said seat tube where they are secured thereto and converge from said seat tube where they are secured to said down tube.

4. The bicycle frame according to claim 2, further comprising:
a force-distributing gusset plate secured between said laterally spaced upper chain stays and having an arcuate metal reinforcement pad at a forward end thereof secured to said seat tube.

5. The bicycle frame according to claim 4, wherein said force-distributing gusset plate is apertured for mounting a rear brake caliper.

6. The bicycle frame according to claim 2, wherein said upper chain stay members, and deflection of said seat tube and said down tube allow rear wheel motion predominantly in a vertical direction of at least ¼-inch.

7. The bicycle frame according to claim 2, wherein said frame is constructed of high strength materials having dimensional properties correlated to the materials' modulus of elasticity to provide a suspension system having a vertical spring constant proportional to a given rider's mass and a natural frequency of oscillation approximately two times a forcing frequency created by the rider's pedaling speed in cycles per second, defined as a pedaling cadence in revolutions per second and two pulses per revolution, one per leg, thereby reducing vibration and avoiding rider bounce due to resonance and amplification of movement induced by a pedaling cadence at or near a resonant frequency.

8. The bicycle frame according to claim 7, wherein said suspension natural frequency of oscillation for a given rider mass is just above a maximum pedaling forcing frequency of 4 cycles per second, defined as a pedaling cadence of two revolutions per second and two pulses per revolution, one per leg.

9. The bicycle frame according to claim 7, wherein said suspension natural frequency of oscillation for a given rider mass is in the range of about 6 to about 10 cycles per second, whereby road-induced vibration is substantially isolated and pedaling efficiency is not adversely affected.

10. The bicycle frame according to claim 2, further comprising:
a tubular insert removably installed inside of said seat tube to selectively increase stiffness, increase damping, and/or limit total rear wheel travel.

11. The bicycle frame according to claim 10, wherein said tubular insert has an outer layer of shock absorbing material.

12. The bicycle frame according to claim 10, wherein said tubular insert has a reduced diameter midportion with a radial flange at each end thereof and an outer layer of shock absorbing material surrounding said midportion; wherein
said radial flanges engage the interior surface of the seat tube and said outer layer does not contact said seat tube during small seat tube deflections, thereby isolating the rider from low-amplitude vibration, but will contact said seat tube during larger seat tube deflections to provide damping upon larger deflections.

13. The bicycle frame according to claim 10, wherein said tubular insert has a reduced diameter midportion with a radial flange at each end thereof; wherein
said radial flanges engage the interior surface of the seat tube and said midportion does not contact said seat tube and resist small seat tube deflections, but will contact said seat tube during larger seat tube deflections to provide resistance to larger deflections.

14. The bicycle frame according to claim 10, wherein said tubular insert has cylindrical opposed end portions and a circumferential concave midportion chat curves longitudinally outward from a reduced diameter center to said end portions; wherein
said end portions engage the interior surface of the seat tube and said midportion is spaced longitudinally differing distance therefrom along its length to allow contact of portions of said seat tube during tube deflections to provide progressive resistance to larger deflections.

15. The bicycle frame according to claim 10, wherein said tubular insert is a hollow tubular member having a top end adapted to receive a hand tool for installing, positioning, and/or removing said insert.

16. The bicycle frame according to claim 2, wherein at least one of said top tube, said down tube and said seat tube has an elliptical or ovate transverse cross section with the major axis extending between lateral sides thereof to provide said bicycle frame with torsional and lateral stiffness while increasing vertical compliance and reducing stresses for a given amount of rear wheel load.

17. The bicycle frame according to claim 2, wherein said down tube and said seat tube each have a sidewall, which viewed in transverse cross section, has a larger wall thickness on lateral sides than the wall thickness of front and rear sides thereof to provide said bicycle frame with torsional and lateral stiffness while increasing vertical compliance for a given amount of rear wheel load.

18. The bicycle frame according to claim 2, wherein said down tube and said seat tube each have a sidewall tapered from a thinner wall thickness at an upper end to a thicker wall thickness at a lower end to facilitate uniform distribution of stresses along said tubes for a given amount of rear wheel travel, and therefore minimize maximum stresses.

19. A tandem bicycle frame having a rear passive suspension system, comprising:
a bicycle frame having a having a front top tube, a front seat tube extending downwardly from one end thereof, a front bottom bracket shell at the bottom end of said front seat tube, a rear top tube, a rear seat tube extending downwardly from one end thereof, a rear bottom bracket shell at the bottom end of said rear seat tube, a down tube connected with said front bottom bracket shell, a bottom tube extending between said front bottom bracket shell and said rear bottom bracket shell, a rear lateral tube extending angularly downward from said front seat tube to said rear bottom bracket shell, a pair of lower chain stay members extending rearwardly from said rear bottom bracket shell, and a pair of laterally opposed rear wheel dropout brackets at the rear end of said lower chain stay members, and
a pair of laterally opposed upper chain stay members secured at one end to said rear wheel dropout brackets extending angularly upward and forward therefrom, secured to said rear seat tube intermediate their length a predetermined distance above said rear bottom bracket shell;
said upper chain stay members extending and converging from said rear seat tube, and secured to at least one of said rear lateral tube and said bottom tube to place said rear seat tube, said rear lateral tube, and said bottom tube in bending when vertical loads are applied to said bottom bracket shells by the riders; wherein said upper chain stay members control rear wheel motion predominantly in a vertical direction and allow a predetermined amount of elastic deflection of said rear seat tube, said rear lateral tube and said bottom tube to isolate the riders from road-surface irregularities and roughness, while maintaining rigidity in other directions to improve handling, comfort, and safety.

* * * * *